United States Patent
Morey et al.

(10) Patent No.: US 9,091,193 B2
(45) Date of Patent: Jul. 28, 2015

(54) SYSTEMS AND METHODS FOR COOLING A DIESEL EXHAUST FLUID DOSING MODULE OF AN AGRICULTURAL VEHICLE

(71) Applicant: CNH America LLC, New Holland, PA (US)

(72) Inventors: Daniel Alan Morey, Mundelein, IL (US); Mark Douglas Klassen, Lockport, IL (US); William Louis Schroeder, Downers Grove, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/105,754

(22) Filed: Dec. 13, 2013

(65) Prior Publication Data

US 2015/0167527 A1  Jun. 18, 2015

(51) Int. Cl.
*F01N 3/02* (2006.01)
*F01N 3/20* (2006.01)

(52) U.S. Cl.
CPC ......... *F01N 3/2046* (2013.01); *F01N 2260/024* (2013.01); *F01N 2610/11* (2013.01)

(58) Field of Classification Search
CPC .......... F01N 2260/024; F01N 2610/11; F01N 2610/1473; F01N 2610/1493; F01P 7/14; F01P 11/0276; F01P 11/04; F01P 2031/30
USPC .................................... 60/295, 301, 303, 320
See application file for complete search history.

(56) References Cited

U.S. PATENT DOCUMENTS

| 4,921,041 | A | 5/1990 | Akachi |
| 6,539,708 | B1 | 4/2003 | Hofmann et al. |
| 7,861,517 | B2 | 1/2011 | Goulette et al. |
| 7,980,063 | B2 | 7/2011 | Cooke |
| 8,261,542 | B2 | 9/2012 | Yager |
| 2006/0053774 | A1 | 3/2006 | Kabasin |
| 2007/0266698 | A1* | 11/2007 | Buerglin et al. ............... 60/282 |
| 2011/0061373 | A1 | 3/2011 | Zimmerman et al. |
| 2011/0283678 | A1 | 11/2011 | Zanetti et al. |
| 2012/0160934 | A1 | 6/2012 | Ponnathpur et al. |

(Continued)

FOREIGN PATENT DOCUMENTS

| DE | 19609306 A1 | 9/1996 |
| DE | 102008052988 A1 | 4/2010 |
| WO | 0077354 A1 | 12/2000 |

OTHER PUBLICATIONS

W. Addy Majewski; Urea Dosing and Injection Systems; dieselnet.com; May 2013; http://dieselnet.com/tech/cat_scr_mobile_urea_dosing.php#urea; last access Dec. 13, 2013.

*Primary Examiner* — Audrey K Bradley
*Assistant Examiner* — Jonathan Matthias
(74) *Attorney, Agent, or Firm* — Sue C. Watson (57) ABSTRACT

An agricultural vehicle including an exhaust system. The exhaust system also includes a dosing module having a fluid inlet and a fluid outlet. Additionally, the exhaust system includes a first conduit coupled directly between the fluid inlet and an engine cooling system of the agricultural vehicle. The first conduit is configured to hold a cooling fluid. The exhaust system also includes a second conduit coupled directly between the fluid outlet and the engine cooling system and is configured to hold the cooling fluid. The cooling fluid is configured to flow from the first and second conduits into the engine cooling system after an engine of the agricultural vehicle is turned off.

13 Claims, 5 Drawing Sheets

(56) References Cited

U.S. PATENT DOCUMENTS

| | | |
|---|---|---|
| 2012/0186226 A1 | 7/2012 | Ren et al. |
| 2012/0211116 A1 | 8/2012 | Young |
| 2013/0000281 A1 | 1/2013 | Merchant et al. |
| 2013/0006504 A1 | 1/2013 | Schreurs |
| 2014/0174696 A1 * | 6/2014 | Fahrenkrug et al. ..... 165/104.11 |

* cited by examiner

SYSTEMS AND METHODS FOR COOLING A DIESEL EXHAUST FLUID DOSING MODULE OF AN AGRICULTURAL VEHICLE

BACKGROUND

The invention relates generally to agricultural vehicles and, more particularly, to systems and methods for cooling a diesel exhaust fluid (DEF) dosing module of an agricultural vehicle.

Emission regulations have lead engine manufacturers and aftermarket suppliers to install exhaust after treatment systems to meet the increasingly stringent requirements. Often, these systems direct exhaust gases through a series of reactions to reduce particulate matter and mono-nitrogen oxide ($NO_X$) emissions in the exhaust stream. Moreover, because the treatment is done after combustion, existing equipment may be retro fit to include the exhaust after treatment systems.

Exhaust after treatment systems typically direct an exhaust stream toward a diesel oxidation catalyst (DOC). The DOC may contain a particulate filter to remove fines and other solid material from the exhaust stream. As the exhaust stream flows over the catalyst, an oxidation reaction may convert the hydrocarbons and carbon monoxide in the exhaust stream into carbon dioxide and water, among other compounds. Next, the exhaust stream may be directed toward a dosing module. The dosing module may contain an injection port for directing a DEF into the exhaust stream. The DEF may be a urea solution that decomposes into ammonia in the exhaust stream. Then, the exhaust stream may be directed toward a selective catalytic reduction reactor (SCR). In the SCR, the ammonia and some exhaust stream components may be converted to nitrogen and water. By using the exhaust after treatment system, emissions may be reduced to meet regulatory requirements.

While exhaust after treatment systems may reduce $NO_X$ emissions from diesel exhaust streams, manufacturers may have difficulties finding suitable locations to mount the additional equipment. This may be especially true in agricultural equipment where space under the hood is limited. Moreover, additional design constraints (e.g., temperature, pressure, etc.) may reduce the number of suitable locations for the exhaust after treatment system.

In some configurations, the exhaust after treatment system also utilizes support equipment. For example, the dosing module may use cooling at its injection port because of exhaust stream temperatures and/or to reduce crystallization of the DEF. Specifically, a cooling fluid from the engine cooling system may be used to cool the dosing module. However, because the cooling fluid flows from the engine cooling system when the engine is running (e.g., the engine supplies power to a pump), an additional reservoir may be used to store cooling fluid for cooling the dosing module after the engine is shut off. The additional reservoir may be plastic to reduce cost and weight, but may also use shielding to protect the plastic material from the heat of the engine and exhaust stream. Additionally, if the reservoir is mounted above the engine cooling fluid system, it may also have a vent to prevent vapor lock in the cooling lines. An extra vent in the system may lead to significant modifications to the engine cooling system. Furthermore, the reservoir may utilize an additional pump to enable circulation after the engine is turned off. However, because of the limited space under the hood, additional reservoirs, heat shielding, pumps, and vents may not be practical. Accordingly, there exists a need for a dosing module cooling system that can use cooling fluid from the engine cooling system without auxiliary equipment.

BRIEF DESCRIPTION

In one embodiment, an agricultural vehicle includes an exhaust system. The exhaust system also includes a dosing module having a fluid inlet and a fluid outlet. Additionally, the exhaust system includes a first conduit coupled directly between the fluid inlet and an engine cooling system of the agricultural vehicle. The first conduit is configured to hold a cooling fluid. The exhaust system also includes a second conduit coupled directly between the fluid outlet and the engine cooling system and is configured to hold the cooling fluid. The cooling fluid is configured to flow from the first and second conduits into the engine cooling system after an engine of the agricultural vehicle is turned off.

In another embodiment, an agricultural vehicle includes an engine, an engine cooling system configured to cool the engine, and an exhaust system. The exhaust system includes a dosing module having a fluid inlet and a fluid outlet and a first conduit coupled directly between the fluid inlet and the engine cooling system. The fluid conduit is configured to hold a cooling fluid. The exhaust system also includes a second conduit coupled directly between the fluid outlet and the engine cooling system and configured to hold the cooling fluid. The cooling fluid is configured to flow from the first and second conduits into the engine cooling system after the engine is turned off.

In a further embodiment, a method for cooling a dosing module is provided. The method includes directing a cooling fluid through a first conduit. The first conduit is coupled directly between a fluid inlet of the dosing module and an engine cooling system. The method also includes directing the cooling fluid from the first conduit into the fluid inlet of the dosing module. The method includes directing the cooling fluid from a fluid outlet of the dosing module and through a second conduit. The second conduit is coupled directly between the fluid outlet of the dosing module and the engine cooling system. The method also includes maintaining a volume of cooling fluid in the first conduit and the second conduit after a pump of the engine cooling system is shut off. The pump is configured to move the cooling fluid.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
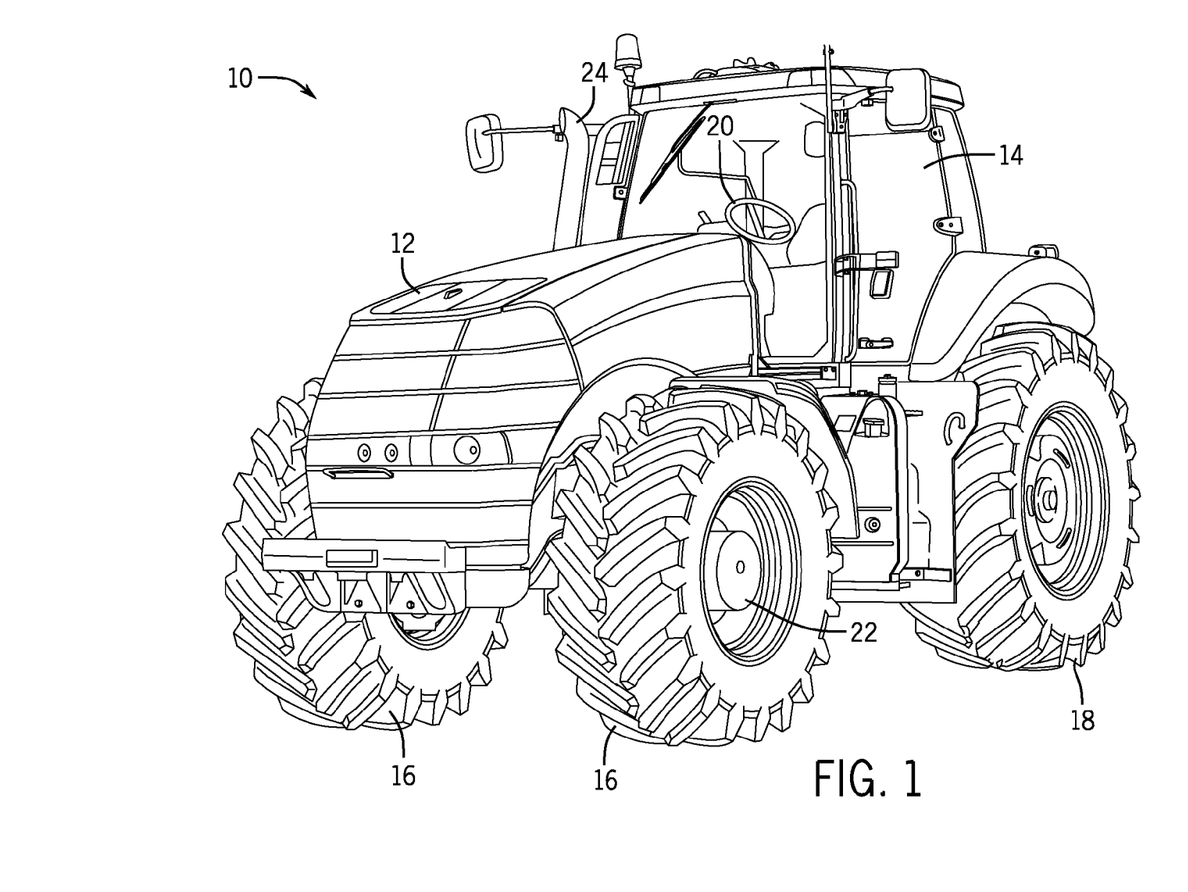
FIG. 1 is a perspective view of an embodiment of an agricultural vehicle that may employ a dosing module cooling system in accordance with the present disclosure.

FIG. 1 illustrates an exemplary agricultural vehicle 10 that may employ an exhaust after treatment system with a dosing module cooling system. In certain embodiments, the agricultural vehicle 10 may be any type of tractor, off-road vehicle, work vehicle, or any other suitable vehicle that utilizes an exhaust after treatment system to meet regulatory emission requirements. The vehicle 10 illustrated has a body 12 that will typically house an engine, transmission, and power train (not separately shown). Further, the agricultural vehicle 10 has a cabin 14 where an operator may sit or stand to operate the vehicle 10. The vehicle 10 has two front wheels 16 and two rear wheels 18 (only one is shown) that rotate to move the vehicle 10 in the depicted embodiment. However, more wheels 16, 18 may be present. For example, the vehicle 10 may have 4, 6, 8, or any number of front wheels 16 and/or back wheels 18. As may be appreciated, the vehicle 10 is maneuvered using a steering wheel 20 that causes the wheels 16 to turn. The wheels 16 are coupled together by an axle 22 so that both wheels 16 may be rotated together. Furthermore, the vehicle 10 has an exhaust 24 that emits byproducts of combustion within the engine. The agricultural vehicle 10 may include an exhaust after treatment system with a dosing module cooling system. The exhaust after treatment system may be utilized to reduce mono-nitrogen oxides ($NO_X$), particulates, or greenhouse gases in the engine exhaust stream. Moreover, the dosing module cooling system may continue to provide cooling to the exhaust after treatment system after the engine is shut off.

Figure 2:
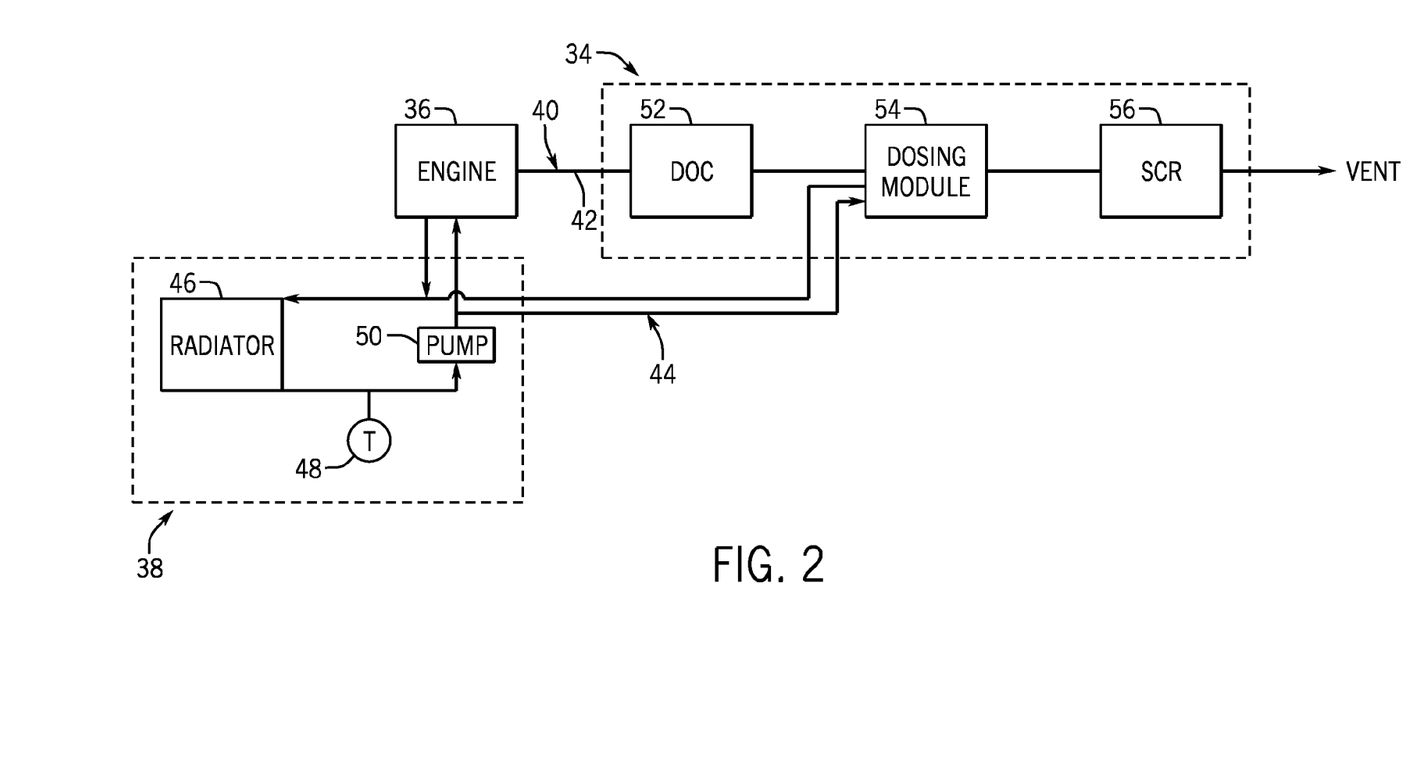
FIG. 2 is a block diagram of an embodiment of a diesel exhaust after treatment system in accordance with the present disclosure.

FIG. 2 is a block diagram of an exhaust after treatment system 34 fluidly coupled to an engine 36 and an engine cooling system 38. The engine 36 may be a diesel engine that directs an exhaust stream 40 to the exhaust after treatment system 34 through an exhaust conduit 42. The exhaust stream 40 may be a product of the combustion and/or operation of the engine 36. Because the combustion process may produce heat, the engine 36 may be coupled to and cooled by the engine cooling system 38. The engine cooling system 38 may be mounted away from the engine 36 or in some embodiments may be mounted directly in front of the engine 36. Moreover, the engine 36 may have ports configured to receive a cooling fluid 44 (e.g., water, glycol, etc.) from the engine cooling system 38.

In some embodiments, the engine cooling system 38 may include a radiator 46, a thermostat 48, and a pump 50. Cooling fluid 44 may be directed toward the engine 36 by the pump 50. That is, the pump 50 may move pressurized cooling fluid 44 to the engine 36. There, the cooling fluid 44 may absorb heat from the engine 36 (e.g., receive energy from the engine 36) and return to the engine cooling system 38. The cooling fluid 44 may enter the radiator 46 when it returns from the engine 36. As the cooling fluid 44 moves through the radiator 46, air may flow over the radiator 46 thereby cooling the cooling fluid 44. Then, the cooling fluid 44 may flow past the thermostat 48 and into the pump 50 to recirculate through the system.

As may be appreciated, the engine cooling system 38 may include additional components not shown (e.g., valves, sensors, etc.).

The engine cooling system 38 may also be configured to direct the cooling fluid 44 toward the exhaust after treatment system 34. The exhaust after treatment system 34 may include a diesel oxidation catalyst (DOC) 52, a dosing module 54, and a selective catalytic reduction reactor (SCR) 56. In certain embodiments, the DOC 52 may include a particulate filter to remove fines or other solid material in the exhaust stream 40.

As the exhaust stream 40 leaves the engine 36 and is directed through the exhaust after treatment system 34 it may pass through the DOC 52. In the DOC 52, the components of the exhaust stream 40 (e.g., carbon monoxide, gaseous hydrocarbons, etc.) may react with the DOC 52 and oxidize to form carbon dioxide and water. Additionally, a filter may remove fines and other solid materials from the exhaust stream 40. In some embodiments, no DOC 52 is included in the exhaust after treatment system 34. Moreover, the filter may be installed separately from the DOC 52, in an exhaust after treatment system 34 that does not include the DOC 52, or not at all. The exhaust stream 40 is directed from the DOC 52 toward the dosing module 54. A diesel exhaust fluid (DEF) may be injected into the exhaust stream 40 using an injector of the dosing module 54 as the exhaust stream 40 passes through the dosing module 54. As may be appreciated, the hydrolysis of DEF in the exhaust stream 40 may produce ammonia. From the dosing module 54 the exhaust stream 40 may flow toward the SCR 56 where an additional reaction converts $NO_X$ in the exhaust stream 40 to nitrogen and water before the exhaust stream 40 is vented to the atmosphere. Accordingly, emissions from the engine 36 may be reduced by injecting DEF into the exhaust stream 40 and utilizing the SCR 56.

Figure 3:
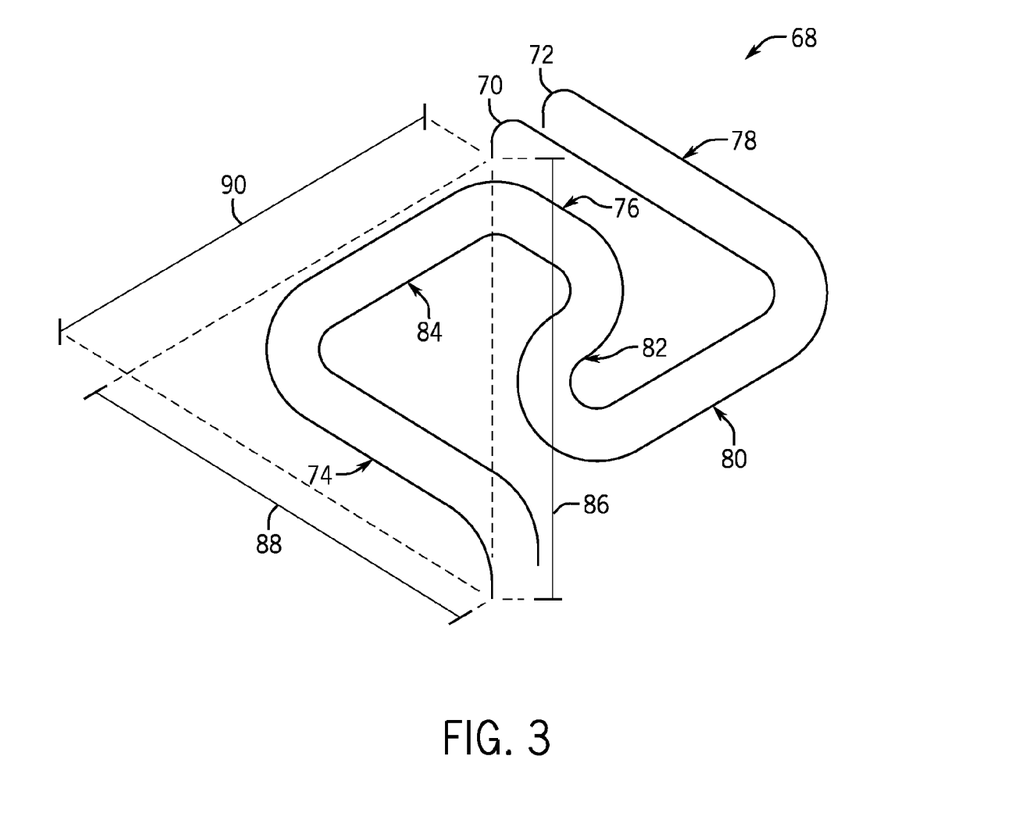
FIG. 3 is a schematic drawing of an embodiment of a dosing module cooling system in accordance with the present disclosure.

FIG. 3 is a schematic drawing of an embodiment of a dosing module cooling system 68. The dosing module cooling system 68 includes a first conduit 70 and a second conduit 72 configured to direct cooling fluid 44 to and/or from the dosing module 54. In some embodiments, the conduits 70, 72 may be made from a rigid tubing material. For example, the conduits 70, 72 may be made from metals (e.g., carbon steel, stainless steel, etc.), polymers (e.g., PVC, etc.), and/or the like. In other embodiments, the conduits 70, 72 may be made from a flexible material. For example, the conduits 70, 72 may be made from polymer tubing (nylon, PVC, etc.), gooseneck metal tubing (e.g., steel), and/or the like. Moreover, the conduits 70, 72 may be made from a combination of both rigid and flexible tubing material. Additionally, the first conduit 70 and the second conduit 72 may be made from different materials. For example, the first conduit 70 may be configured to direct cold cooling fluid 44 (e.g., cooling fluid 44 cooled in the radiator 42) from the engine cooling system 38 to the dosing module 54 and, therefore, may be made from a material with a lower thermal conductivity than the second conduit 72 to block heat transfer to/from the cooling fluid 44 as it flows to the dosing module 54. In contrast, the second conduit 72 may be configured to return the cooling fluid 44 to the engine cooling system 38 after the cooling fluid 44 has passed through the dosing module 54 and, therefore, may be made from a material with a higher thermal conductivity to facilitate heat transfer as the cooling fluid 44 flows back to the engine cooling system 38.

The first conduit 70 and the second conduit 72 may be circuitously routed. In other words, the first conduit 70 and the second conduit 72 may have many generally parallel sections. For example, the first conduit 70 and the second conduit 72 may be generally "S" shaped or sigmoidal. That is, the first conduit 70 and the second conduit 72 may each have multiple bends (e.g., the conduit routing will change direction) in order to fit within a confined space within the body 12 of the agricultural vehicle 10. For example, a first section 74 may be generally parallel to a second section 76 and a third section 78. Moreover, a fourth section 80 may be generally parallel to a fifth section 82 and a sixth section 84. Furthermore, the circuitous routing may contain the first and second conduits 70, 72 (sections) that are generally perpendicular to one another. For example, the first section 74 may be generally perpendicular to the fourth section 80, the fifth section 82, and the sixth section 84.

As may be appreciated by one skilled in the art, using the conduits 70, 72 with circuitous routing leads to a greater volume of fluid being directed toward the dosing module 54 than if conduit was routed to the engine cooling system 38 along the shortest possible path. For example, a first length 86 is shorter than the sum of a second length 88 and a third length 90. Accordingly, the conduits 70, 72 being routed circuitously along the second length 88 and the third length 90 will have a greater overall length, which directly corresponds to a greater volume, than if the conduits 70, 72 were routed along the first length 86 (e.g., the shortest possible path). Moreover, circuitous routing enables a substantial amount of the cooling fluid 44 to travel to the dosing module 54 in a relatively confined space. The dosing module cooling system 68 may be secured within the body 12 of the agricultural vehicle 10 as required by design constraints to reduce potential stress points and/or to minimize vibration.

Additionally, the circuitous routing of the conduits 70, 72 enables cooling of the dosing module 54 after the engine 36 is shut off without the use of an additional cooling fluid 44 tank because a sufficient volume (e.g., at least equal to an additional tank that could occupy the same volume of space) will remain in the conduits 70, 72 after the engine 36 is shut off. In other words, the volume of the conduits 70, 72 can be equal to an additional tank because of the added length of the circuitous routing. Furthermore, unlike additional tanks that frequently require vents and modifications to cooling systems, the conduits 70, 72 may be self purging as described in more detail below.

Additional methods may be employed to further increase the amount of cooling provided to the dosing module 54. For example, the first conduit 70, the second conduit 72, or both may be finned tubes. In other words, the conduits 70, 72 may have radial extensions that increase the surface area of the conduits 70, 72 and facilitate a larger amount of heat transfer with the surrounding atmosphere. In some embodiments, the conduits 70, 72 may be "twisted tubes" designed to maximize turbulent flow in the conduits 70, 72 and therefore increase heat transfer. As will be appreciated by one skilled in the art, many additional methods could be applied to increase the heat transfer of the conduits 70, 72 without substantially changing the volume of the conduits 70, 72.

In some embodiments, the dosing module cooling system 68 may be substantially mounted above the engine cooling system 38 (e.g., above an expansion tank associated with the engine cooling system 38). That is, a volume of the first conduit 70 and a volume of the second conduit 72 will be at a higher elevation than the engine cooling system 38. As a result, when the engine 36 is shut off and the pump 50 is no longer moving the cooling fluid 44, cooling fluid 44 will remain in the conduits 70, 72 of the dosing module cooling system 68 for a period of time. The volume of the cooling fluid 44 that remains in the conduits 70, 72 functions like an additional reservoir and enables the dosing module 54 to be cooled even when the engine cooling system 38 is not circulating the cooling fluid 44. As will be described in more detail below, the dosing module cooling system 68 may continue to circulate cooling fluid 44 through the dosing module 54 after the engine 36 is shut off via a thermosiphon.

Figure 4:
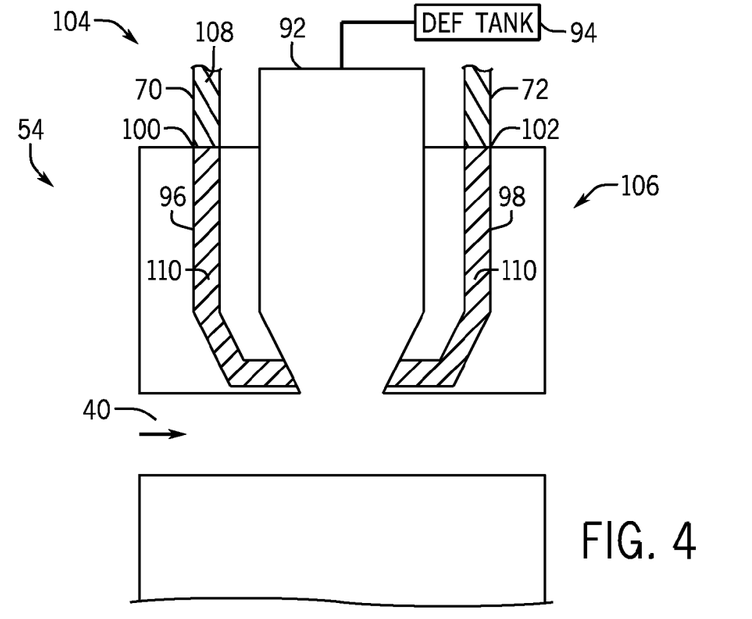
FIG. 4 is a cross-sectional side view of a dosing module utilizing a dosing module cooling system in accordance with the present disclosure.

FIG. 4 is a cross-sectional view of the dosing module 54 in accordance with one embodiment of the present disclosure. The dosing module 54 includes an injector 92, a DEF tank 94, and additional associated components (e.g., thermostats, metering valves, pumps, sensors, etc.). The injector 92 protrudes through a wall of the dosing module 54 and extends into the exhaust stream 40. DEF may be injected into the exhaust stream 40 using the injector 92 as the exhaust stream 40 passes through the dosing module 54. The hydrolysis of DEF in the exhaust stream 40 may produce ammonia. By extending into the exhaust stream 40, the injector 92 may spray the DEF evenly into the exhaust stream 40 and reduce the occurrence of deposits contacting and/or forming on the dosing module 54 walls. However, in some embodiments, the injector 92 may only extend as far as the wall thickness of the dosing module 54. In some embodiments, the injector 92 may be equipped with an atomizing or misting nozzle configured to inject the DEF in small droplets that more readily evaporate and/or mix in the exhaust stream 40. Moreover, depending on design conditions, the injector 92 may be configured to inject the DEF in a downstream direction (e.g., in the direction of the exhaust stream 40 flow toward the SCR 56). However, the DEF may also be injected in the upstream direction.

The dosing module 54 may be made from a variety of materials. For example, the dosing module 54 may be made from a metal (e.g., steel, alloys, etc.) to withstand high temperatures and/or environmental contaminants from fluids/gases. However, some parts of the dosing module 54 may not be made of metals. For example, the DEF tank 94 may be made from a polymeric material. Because the dosing module 54 may be exposed to high temperatures of the exhaust stream 40, the dosing module 54 includes a first cooling channel 96 and a second cooling channel 98. The first cooling channel 96 and the second cooling channel 98 may be connected. In certain embodiments, the cooling channels 96, 98 are configured to surround and/or cool the injector 92 as well as the other components of the dosing module 54. Also, in some embodiments, the cooling channels 96, 98 may form a single annulus that surrounds the injector 92. For example, the dosing module 54 may have an annulus that receives the injector 92. The annulus may be larger than the diameter of the injector 92, leaving space for cooling fluid 44 to flow around the injector 92. Furthermore, in some embodiments the injector 92 and dosing module 54 may be formed together as a single piece. Moreover, the cooling channels 96, 98 may be embedded in, or pass through, the injector 92. As may be appreciated by one skilled in the art, the location, size, and number of the cooling channels 96, 98 may be selectively varied as desired. The cooling channels 96, 98 are fluidly coupled to the first conduit 70 and the second conduit 72. That is, the first conduit 70 is coupled to the first cooling channel 96 at a cooling fluid inlet 100. Similarly, the second conduit 72 is coupled to the second cooling channel 98 at a cooling fluid outlet 102.

The first cooling channel 96 may be configured to receive the cooling fluid 44 from the engine cooling system 38 via the first conduit 70. In some embodiments, the cooling fluid 44 may flow from the engine cooling system 38 through the first conduit 70 into the first cooling channel 96 and then into the second cooling channel 98. Then, the cooling fluid 44 may flow through the second cooling channel 98 to the second conduit 72 and return to the engine cooling system 38. As the cooling fluid 44 circulates through the dosing module 54, it may absorb heat from the exhaust stream 40. That is, the cooling fluid 44 may be at a lower temperature than the exhaust stream 40 and increase in temperature the longer it interacts with the exhaust stream 40. Therefore, the cooling fluid 44 may be cooler in the first cooling channel 96 than in the second cooling channel 98 if the cooling fluid 44 is flowing from the first cooling channel 96 into the second cooling channel 98. In other words, cooling fluid 44 may be in a cool region 104 before it enters the dosing module 54 and in a heated region 106 as it flows through the dosing module 54. Additionally, the cooling fluid 44 may re-enter the cool region 104 after it leaves the dosing module 54. While the cooling fluid 44 is noted as flowing from the first cooling channel 96 to the second cooling channel 98, it should be noted that in some instances the cooling fluid 44 may flow from the second cooling channel 98 to the first cooling channel 96.

Figure 5:
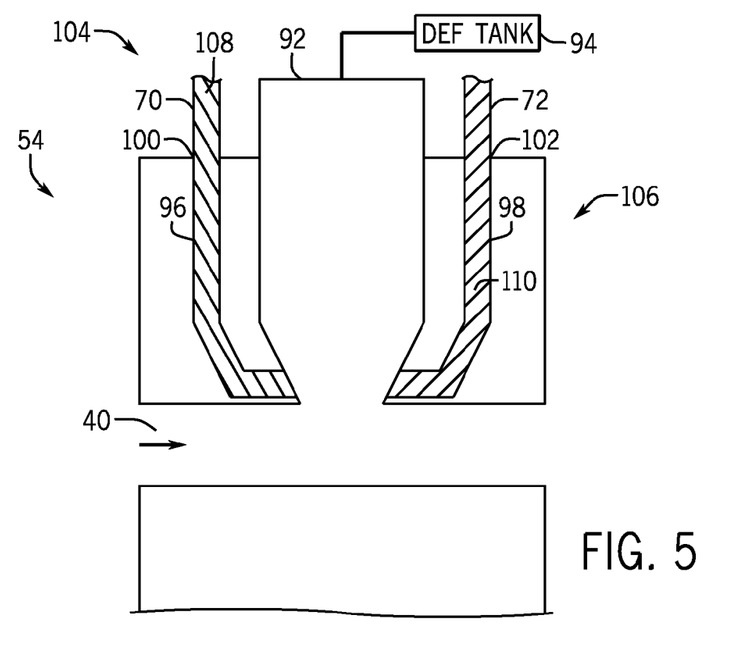
FIG. 5 is a cross-sectional side view of a dosing module utilizing a dosing module cooling system with a thermal siphon circulating a cooling fluid in accordance with the present disclosure.
Figure 6:
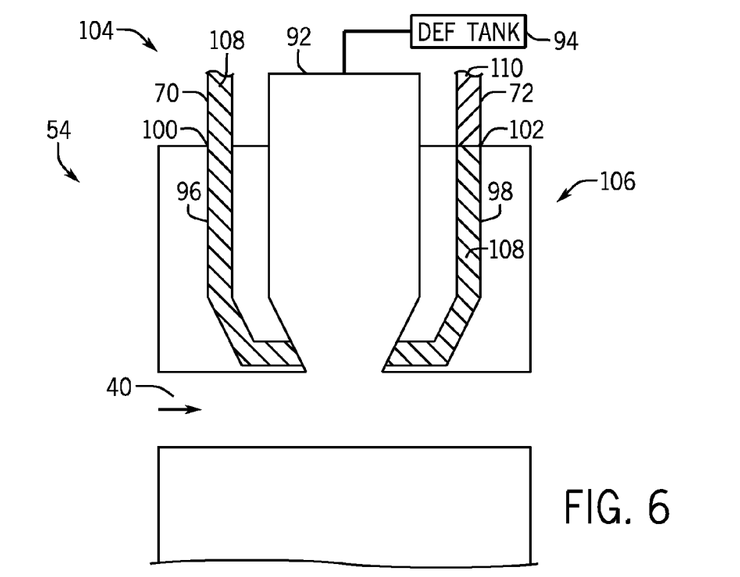
FIG. 6 is a cross-sectional side view of a dosing module utilizing a dosing module cooling system after a thermal siphon has replaced a volume of cooling fluid in accordance with the present disclosure.

An illustration of the thermosiphon that may circulate the cooling fluid 44 through the dosing module 54 in accordance with an embodiment of the disclosure is presented in FIGS. 5 and 6. As discussed above, the cooling fluid 44 may enter the dosing module 54 through the cooling fluid inlet 100 via the first conduit 70 fluidly coupled to the first cooling channel 96. Before entering the dosing module 54, the cooling fluid 44 may be in the cool region 104. As such, the heat of the exhaust stream 40 is not acting on the cooling fluid 44. However, once exposed to the heat of the exhaust stream 40 the cooling fluid 44 may enter the heated region 106. In the heated region 106, the cooling fluid 44 may absorb heat and increase in temperature compared to the cooling fluid 44 in the cool region 104. As the temperature of the cooling fluid 44 in the heated region 106 increases, the density of the cooling fluid 44 may decrease. As a result, the cooling fluid 44 in the heated region 106 may begin to flow or migrate out of the heated region 106 and be replaced by the cooling fluid 44 from the cool region 104.

As shown in FIG. 5, a second volume 110 of heated cooling fluid 44 may move out of the heated region 106 through the second cooling channel 98 and be replaced by a first volume 108 of cooler cooling fluid 44 from the cool region 104 via the first cooling channel 96. Moreover, as illustrated in FIG. 6, as the second volume 110 of heated cooling fluid 44 continues to leave the heated region 106, due to having a lower density than the first volume 108 of cooling fluid 44 in the cool region 104, the first volume 108 of cooling fluid 44 from the cool region 104 may continue to enter the heated region 106 until the second volume 110 of cooling fluid 44 in the heated region 106 is substantially replaced by the first volume 108 of cooling fluid 44 from the cool region 104. In other words, cooler cooling fluid 44 will replace the heated cooling fluid 44 as long as there is a sufficient thermal gradient to cause the circulation of the cooling fluid 44.

The process of circulating the cooling fluid 44 through the dosing module 54 via thermosiphon may continue as long as there is a sufficient temperature gradient between the cooling fluid 44 in the cool region 104 and the cooling fluid 44 in the heated region 106. For example, the cooling fluid 44 that was previously in the heated region 106 may sufficiently cool after it enters the cool region 104 to create a large enough temperature gradient between it and the cooling fluid 44 that replaced it in the heated region 106. Therefore, returning to the example above, the second volume 110 of the cooling fluid 44 may sufficiently cool to replace the first volume 108 of cooling fluid in the heated region 106. This process may continue until the dosing module 54 reaches an ambient temperature or the cooling fluid 44 in the first conduit 70 and the second conduit 72 has drained back into the engine cooling system 38.

Figure 7:
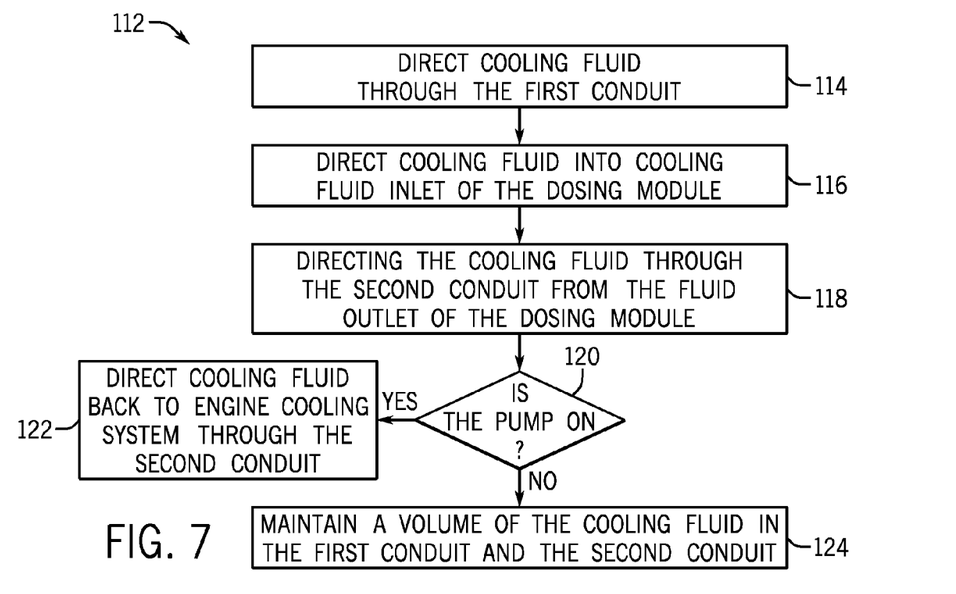
FIG. 7 is a flow chart of an embodiment of a method for cooling a dosing module after an agricultural engine is shut off and utilizing a dosing module cooling system in accordance with the present disclosure.

FIG. 7 is a flowchart of one embodiment of a method 112 for cooling the dosing module 54. The cooling fluid 44 may be directed through the first conduit 70 (block 114). The first conduit 70 may be coupled directly between the cooling fluid inlet 100 of the dosing module 54 and the engine cooling system 38. The first conduit 70 may direct the cooling fluid 44 into the cooling fluid inlet 100 of the dosing module 54 (block 116). The cooling fluid 44 may exit the dosing module 54 through the cooling fluid outlet 102 and enter the second conduit 72 (block 118). The second conduit 72 may be coupled directly between the cooling fluid outlet 102 of the dosing module 54 and the engine cooling system 38. At block 120, the operation of the pump 50 determines how cooling the dosing module 54 proceeds. If the pump 50 is on, the cooling fluid 44 will be directed back to the engine cooling system 38 (block 122). However, if the pump 50 is off, the volumes 108, 110 of the cooling fluid 44 may be maintained in the first conduit 70, the second conduit 72, and the dosing module 54 (block 124). As may be appreciated, the pump 50 may be configured to move the cooling fluid 44 from the cooling system 38 through the dosing module 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural vehicle comprising:
an exhaust system comprising:
a dosing module having a fluid inlet and a fluid outlet;
a first conduit coupled directly between the fluid inlet and an engine cooling system of the agricultural vehicle, wherein the first conduit is configured to hold a cooling fluid, and the engine cooling system is configured to supply the cooling fluid to at least an engine of the agricultural vehicle; and
a second conduit coupled directly between the fluid outlet and the engine cooling system and configured to hold the cooling fluid, wherein the cooling fluid is configured to flow from the first and second conduits into the engine cooling system after the engine of the agricultural vehicle is turned off;
wherein the first conduit is circuitously routed such that the first conduit contains a plurality of bends between the engine cooling system and the fluid inlet, the second conduit is circuitously routed such that the second conduit contains a plurality of bends between the engine cooling system and the fluid outlet, at least one of the first conduit and the second conduit includes a plurality of parallel conduit portions, and the circuitously routed first and second conduits form a total volume of cooling fluid sufficient to cool the dosing module to an approximately ambient temperature after the engine of the agricultural vehicle is turned off.

2. The agricultural vehicle of claim 1, wherein both the first conduit and the second conduit include the plurality of parallel conduit portions.

3. The agricultural vehicle of claim 1, wherein the first conduit and the second conduit are self purging.

4. The agricultural vehicle of claim 1, wherein at least one of the first conduit and the second conduit is configured to direct a first volume of the cooling fluid from the dosing module toward the engine cooling system after the cooling fluid is heated by the dosing module.

5. The agricultural vehicle of claim 4, wherein the at least one of the first conduit and the second conduit is configured to replace the first volume of cooling fluid removed from the dosing module with a second volume of cooling fluid.

6. An agricultural vehicle comprising:
an engine;
an engine cooling system configured to cool the engine by supplying a cooling fluid to at least the engine;
an exhaust system comprising:
   a dosing module having a fluid inlet and a fluid outlet;
   a first conduit coupled directly between the fluid inlet and the engine cooling system, wherein the fluid conduit is configured to hold the cooling fluid; and
   a second conduit coupled directly between the fluid outlet and the engine cooling system and configured to hold the cooling fluid, wherein the cooling fluid is configured to flow from the first and second conduits into the engine cooling system after the engine is turned off;
wherein the first conduit is circuitously routed such that the first conduit contains a plurality of bends between the engine cooling system and the fluid inlet, the second conduit is circuitously routed such that the second conduit contains a plurality of bends between the engine cooling system and the fluid outlet, at least one of the first conduit and the second conduit includes a plurality of parallel conduit portions, and the circuitously routed first and second conduits form a total volume of cooling fluid sufficient to cool the dosing module to an approximately ambient temperature after the engine of the agricultural vehicle is turned off.

7. The agricultural vehicle of claim 6, wherein the engine cooling system comprises a radiator, a thermostat, and a pump.

8. The agricultural vehicle of claim 6, wherein the engine cooling system is configured to supply the cooling fluid to the dosing module through the first conduit while the engine is running.

9. The agricultural vehicle of claim 6, wherein the dosing module comprises a diesel exhaust fluid injector.

10. A method of cooling a dosing module, comprising:
directing a cooling fluid through a first conduit, wherein the first conduit is coupled directly between a fluid inlet of the dosing module and an engine cooling system, wherein the engine cooling system is configured to supply the cooling fluid to at least an engine;
directing the cooling fluid from the first conduit into the fluid inlet of the dosing module;
directing the cooling fluid from a fluid outlet of the dosing module and through a second conduit, wherein the second conduit is coupled directly between the fluid outlet of the dosing module and the engine cooling system, the first conduit is circuitously routed such that the first conduit contains a plurality of bends between the engine cooling system and the fluid inlet, the second conduit is circuitously routed such that the second conduit contains a plurality of bends between the engine cooling system and the fluid outlet, at least one of the first conduit and the second conduit includes a plurality of parallel conduit portions; and
maintaining a volume of cooling fluid in the circuitously routed first and second conduits sufficient to cool the dosing module to an approximately ambient temperature after a pump of the engine cooling system is shut off, wherein the pump is configured to move the cooling fluid.

11. The method of claim 10, wherein the volume of cooling fluid in the first conduit and the second conduit is configured to flow through the dosing module after the pump is shut off via a thermosiphon.

12. The method of claim 10, wherein the first conduit and the second conduit are configured to direct the cooling fluid to the engine cooling system after the dosing module reaches approximately an ambient temperature.

13. The method of claim 10, wherein the cooling fluid is supplied by the engine cooling system.

\* \* \* \* \*